United States Patent [19]

Toti et al.

[11] 4,295,660
[45] Oct. 20, 1981

[54] ACTIVE SUSPENSIONS ASSEMBLY FOR A MOTOR CAR

[75] Inventors: Gabriele Toti, Milan; Giuliano Lenzi, Arese; Paolo Monti, Lazzate, all of Italy

[73] Assignee: Alfa Romeo S.p.A., Milan, Italy

[21] Appl. No.: 43,793

[22] Filed: May 30, 1979

[30] Foreign Application Priority Data

Jun. 8, 1978 [IT] Italy .............................. 24338 A/78
Mar. 29, 1979 [IT] Italy .............................. 21421 A/79

[51] Int. Cl.³ ............................................. B60G 11/26
[52] U.S. Cl. .............................. 280/714; 280/DIG. 1
[58] Field of Search ............... 280/714, 689, 693, 698, 280/703, DIG. 1

[56] References Cited

U.S. PATENT DOCUMENTS

| | | | |
|---|---|---|---|
| 3,021,151 | 2/1962 | Haddad | 280/714 |
| 3,166,340 | 1/1965 | Rusconi | 280/698 |
| 3,778,081 | 12/1973 | Takahashi et al. | 280/714 |
| 4,030,777 | 6/1977 | Rabenseifner | 280/714 |
| 4,143,925 | 3/1979 | Young | 280/714 |

FOREIGN PATENT DOCUMENTS

2411796 9/1974 Fed. Rep. of Germany ...... 280/703

*Primary Examiner*—Joseph F. Peters, Jr.
*Assistant Examiner*—Ross Weaver
*Attorney, Agent, or Firm*—Charles E. Brown

[57] ABSTRACT

A hydraulic and pneumatic suspension system for motor vehicle is disclosed, the improvement consisting in that each stay tube of the system is connected to a liquid-level-adjuster of its own and is also connected to a load-shift adjuster: the latter device is capable of controlling, according to a preselected value, the ratio of distribution of the load between the wheels of the front axles and those of the rear axle. These interconnections are such as to provide an improved control of the rolling and the pitching movements of the vehicle body while concurrently providing a better shock dampening in the case in which one wheel only is engaged by an isolated obstacle.

10 Claims, 3 Drawing Figures

ACTIVE SUSPENSIONS ASSEMBLY FOR A MOTOR CAR

This invention relates to the suspensions for a motor car, of the so-called active type, that is, capable of maintaining the body of a motor car (i.e. the suspended mass) to a preselected level and in a preselected trim relative to the wheel hubs (non-suspended mass), irrespective of the variations of the static and the dynamic loads which may occur when the vehicle is in use.

A number of embodiments of active suspensions are known, and, as a rule, this type of suspensions comprises, in addition to the usual resilient means and the shock-absorbers for passively controlling the movements of the car body relative to the wheels, telescopable stay tubes which are filled with a liquid; the volume of the latter is automatically expanded or reduced as the load is being varied, in such a way that the car body retains a preselected trim relative to the wheels.

A few of these suspensions are preset for entering action in the only case of variations of the trim of the car body which are caused by variations of the static load (i.e. passengers and luggage) whereas other types are also capable of resetting the trim in the case of variations of the dynamic load, such as under conditions of pitching (braking and acceleration) or also under conditions of rolling (in a bend).

Such suspension systems, and, above all, those of the latest types, offer a number of advantages as compared with the conventional systems, inasmuch as the resilient component parts and the shock-absorbing means are entrusted with the task of smoothing the uneveness of the road, whereas the problems as to trim and also as to the load transfer can be solved independently. In addition, the load transfer can be appropriately modified relative to the "natural" condition. An improved solution of the comfort problem is thus achieved. In addition, the constant trim as obtained with the active suspensions involves direct advantages such as the possibility of dispensing with adjustments of the headlights and of confining the overall dimensions when designing the suspensions. Indirect advantages, which are as much important, are, for example, the fact of being enabled to work always with the suspension system under the conditions of design and with the tires constantly in the optimum position relative to the ground, the result being a better road stability and a longer life of the tires.

This invention relates to a suspension system which is responsive both to the variations of static load and of dynamic load such as they are experienced under conditions of pitching and rolling movements of the vehicle. These suspensions are, as compared with the conventional approaches, much more satisfactory due to the possibility of varying their calibration easily, the better behaviour in the presence of road surface unevenness and the promptness and accuracy of their response. These functional advantages are complemented by a certain simplicity of construction which makes the suspensions in question interesting from an economical standpoint.

The suspensions according to the invention are composed by usual resilient means and shock-absorbing means inserted between the car body and the car wheels, by telescopable stay tubes filled with a liquid, each of such tubes being interposed between the body and the bearing of a wheel, by level adjusters operatively connected to said telescopable stay tubes, said level adjusters comprising valve means adapted to establish a communication between said telescopable stay tubes alternately with a source of a liquid under pressure and with a sump, and also comprising means responsive to the variations of the relative distance between the car body and each wheel, said responsive means being connected both to the car body and the hub of each wheel through means which are adapted to filter the signals indicating said variations of the relative distance, so that the signals representative of uneveness of the road are not detected, said responsive means being operatively connected to said valve means to command them to establish a communication between said stay tubes and the source of the pressurized liquid whenever a depression of the car body relative to the wheels is detected, and to command said telescopable stay tubes with the sump whenever a rise is detected of the car body relative to the wheel, said suspensions being characterized in that each of said telescopable stay tubes is operatively connected to a level adjuster of its own and is also operatively connected to a load-shift adjuster adapted to check the distribution ratio of the load shifts among the more or less heavily loaded wheels of the front wheel assembly and the rear wheel assembly under pitching and rolling conditions of the car by properly interconnecting the stay tubes of the wheels of at least either wheel assembly.

Features and advantages of the invention will better be understood from the scrutiny of the accompanying drawings which show diagrammatically, by way of non-limiting example, two possible embodiments of this invention.

Figure 1:
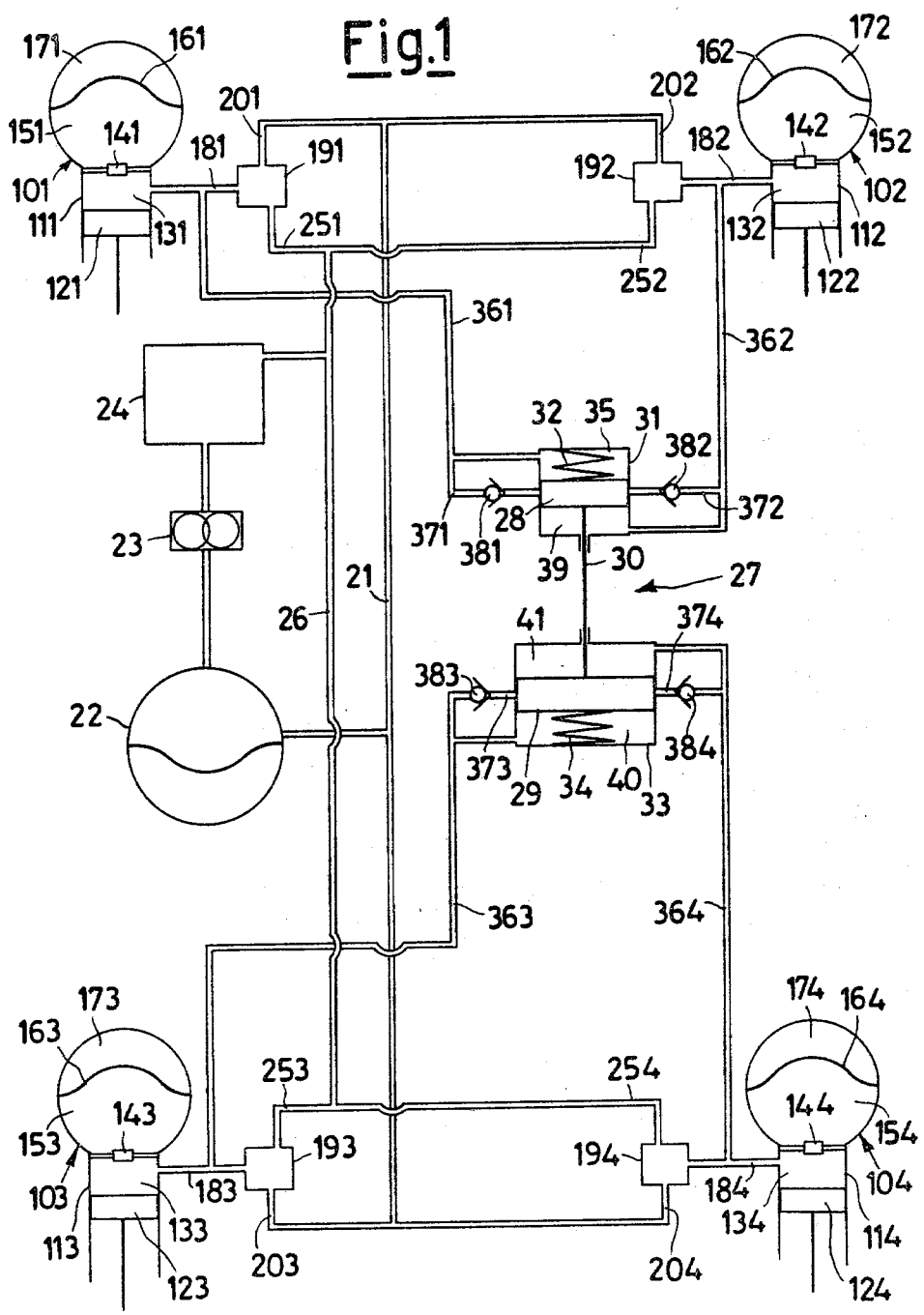
FIG. 1 is an overall view of a first example of suspensions according to the invention.

In FIG. 1, there are generally indicated at 101, 102, 103 and 104 the stay tubes (telescopable) relative to each car wheel. The first two stay tubes, for example, are those for the front wheel assembly, and the second two are those for the rear wheel assembly. Each stay tube is composed by a cylinder which is connected to the car body, i.e. the suspended mass, not shown in the drawing, and by a piston connected to the relevant wheel, or non-suspended mass (also not shown in the drawing). For the stay tube 101, the cylinder is indicated at 111 and its piston at 121. For the stay tube 102, the relevant cylinder and piston are indicated at 112 and 122, respectively. For the stay tube 103 they are indicated at 113 and 123, respectively, and, lastly, they are indicated at 114 and 124, respectively, for the stay tube 104.

The internal space (131, 132, 133, 134) of each cylinder (111, 112, 113, 114) is filled with a liquid under pressure and is connected by throttling valves (141, 142, 143, 144) to a chamber (151, 152, 153, 154, respectively) also filled with a liquid under pressure: a diaphragm (161, 162, 163, 164) partitions said chamber to divide it from a second chamber (171, 172, 173, 174 respectively) which is filled with a gas under pressure.

The throttling valves interposed between said two chambers act as shock-absorbing members for the suspensions, whereas the chambers filled with a gas under pressure are active as elastic members of the same suspensions.

The internal space of each cylinder (131, 132, 133, 134) is likewise connected, by a duct (181, 182, 183, 184 respectively) to a level adjuster such as 191, 192, 193, 194, each of which is diagrammatically indicated by a block since it is a conventional member. Each level-adjuster comprises a slide valve and means responsive to the variations of the distance which separates the car body from each wheel, said means being connected to the car body and the wheel hub via means which are adapted to filter off appropriately the signals which indicate the variations of the distance in question so as to prevent the signal due to shocks caused by road unevenness from being detected. Each slide valve is operatively connected to the respective responsive means and is connected, via a duct such as 201, 202, 203, 204, to a pressurized liquid main 21 coming from an accumulator 22: the latter, via a pump 23, is fed by a tank 24.

Each slide valve, then, is connected by a duct such as 251, 252, 253, to a sump line 26 which opens into a reservoir 24.

In the drawings, 27 generally indicates a loadshift adjuster composed by a couple of double-acting pistons 28 and 29: these are made integral by a common rod 30. The pistons have different cross-sectional area from one another, as a function of the required distribution ratio of the load between the front and the rear assembly. They could, however, have the same cross-sectional area and could be connected mutually by a linkage with a variable transfer ratio (such as in the embodiment of FIG. 2). The piston 28 slides in a sealtight manner in its own cylinder, indicated at 31, and is biassed by a spring, the latter being shown at 32. Also the piston 29 is slidable in a sealtight manner in its own cylinder, shown at 33, and is biassed by a spring indicated at 34.

The chamber 35 of the cylinder 31 communicates with the internal space 131 of the telescopable stay tube 101 by a duct 361: the latter starts from the duct 181. The midway section of the cylinder 31, in its turn, is connected to a branching-off 371, of the duct 361: the latter has, inserted therein, a non-return valve 381. The chamber 39 of the cylinder 31 communicates with the internal space 132 of the telescopable stay tube 102 by a duct 362, the latter stemming from the duct 182. A midway section of the cylinder 31, in its turn, is connected to a branching-off, 372, of the duct 362, and the latter duct has, inserted therein, a non-return valve 382. The chamber 40 of the cylinder 33 communicates with the internal space 133 of the telescopable stay tube 103 by a duct 363 stemming from the duct 183. A midway section of the cylinder 33 is connected, in its turn, to a branching-off 373 of the duct 363 and the latter duct has a non-return valve 383, inserted therein. The chamber 41 of the cylinder 33, lastly, communicates with the internal space 134 of the telescopable stay tube 104 by a duct 364 which stems from the duct 184. A midway section of the cylinder 33 is connected, in its turn, to a branching-off 374, of the duct 364: said duct has, inserted therein, a non-return valve 384.

If the pressures on the surfaces of the two pistons 28 and 29 are at a balance, the two springs 32 and 34 keep the pistons in a neutral or starting position: this position is selected, in such a case, in such a way that the pistons cut off the branching-offs 371, 372, 373, 374.

The operation of the suspensions described hereinabove is the following.

Whenever the weight of the vehicle is increased but the position of center of gravity remains unaltered, there is an increase of the static load with respect to the design value. The means which are adapted to detect the variations of the relative distance between the car body and each car wheel, these means being a part of the blocks 191, 192, 193, 194, enter action and command their respective slide valves, these also being included in the blocks 191, 192, 193, 194, and establish a communication between the internal spaces (131, 132, 133, 134) of every telescopable stay tube with the main 21 and the accumulator 22 which contain a pressurized liquid. Thus, liquid under pressure reaches the internal spaces of the telescopable stay tubes, via the ducts 201, 202, 203, 204, and 181, 182, 183, 184, in a volume which is sufficient to lift the car body and to restore the level thereof relative to the wheels to the value it had before the load increase.

When, conversely, a decrease of the static load relative to the design value is experienced on the vehicle wheels, the means themselves which are adapted to detect the variations of the distances between the body and each individual car wheel, command the slide valves to establish a communication between the internal spaces of every telescopable stay tube and the sump line 26 and with the tank 24. By so doing, the volume of liquid which is required to lower the car body relative to the car wheels to the level existing prior to the occurrence of the load decrease, is discharged, via the ducts 181, 182, 183, 184, and 251, 252, 253, 254.

During progress of these operations, the load-shift adjuster 27 does not enter action inasmuch as its pistons 28 and 29 are at a balance and thus are not shifted.

Whenever the car pitches as a result of a braking or an acceleration, a load-shift occurs from the couple of wheels of a wheel assembly (rear or front) to the other wheel assembly (front or rear). When braking there is an increase of load on the front wheels and a concurrent decrease of load on the rear wheels. The opposite situation is experienced during an acceleration.

In such cases, the means adapted to detect the variations of the mutual distances between the car body and each individual wheel command the slide valve of each wheel of the couple of wheels (rear or front) on which a load increase has occurred, to establish a communication between the internal space of the respective telescopable stay tube and the pressurized fluid main 21 and also with the accumulator 22; the slide valve of each wheel of the couple of wheels in which a load decrease has been experienced is commanded, conversely, to establish a communication between the internal space of the respective telescopable stay tube of each wheel and the sump line 26 and with the tank 24.

The increase of the fluid volume under pressure in the stay tubes corresponding to the wheels which have been more heavily loaded, and the concurrent discharge of fluid from the stay tubes corresponding to the wheels on which the load has been released, are such as to take up the variation of trim of the car body and to neutralize pitching.

Also in such a case the load-shift adjuster 27 does not enter action inasmuch as its pistons 28 and 29 are at a balance.

When a car negotiates a road bend, a load shift is experienced from the farside wheel couple to the nearside wheel couple as a result of the rolling movement: in such a case, the means which are adapted to detect the variations of the distances between the car body and each car wheel command the slide valves of each wheel of the couple of wheels undergoing a load increase to establish a communication between the internal space of the respective telescopable stay tube and the pressurized liquid main 21 and the accumulator 22, while concurrently commanding the slide valves of each wheel undergoing a load decrease to establish a communication between the internal space of its respective telescopable stay tube and the sump line 26 and the tank 24. Consequently, liquid under pressure is fed to the stay tubes of the more heavily loaded wheels, whereas the stay tubes of the less loaded wheels deliver a fractional volume of liquid, so that the car body tends towards coming back to the trim it had before the negotiation of the road bend and rolling is offset.

The action of the level-adjusters, however, which is identical on the two stay tubes of the front and the rear wheel/couples, is accompanied by the simultaneous entering action of the load-shift adjuster 27: the latter has the function of setting up a well defined ratio between the load shifts of the front and the rear wheels in rolling, as required by the necessity of achieving an optimum degree of understeering for the car concerned.

More exactly, as will be set forth more clearly, hereinafter, the load-shift adjuster 27 enters action by appropriately connecting the nearside and farside suspensions of a couple of wheels until obtaining a balanced situation of the pressures on the pistons 28 and 29 of the adjuster, that is to say, a well defined ratio of the load-shifts under rolling conditions, for the front and rear wheels. Such a ratio is a function of the preselected ratio between the cross-sectional areas of the pistons 28 and 29, or the transmission ratio of the linkage which connects the pistons in the case in which the pistons have the same cross-sectional area as is the case in FIG. 2.

Assuming, by way of example, that the car goes through a bend toward the right, so that the wheels undergoing the heavier load are those connected to the stay tubes 101 and 103 and the wheels subjected to the lighter load are those connected to the stay tubes 102 and 104 as shown in the drawings, there will be a pressure increase in the chamber 40 of cylinder 33, whereas in the chamber 41 of the same cylinder 33 a pressure drop will occur. Likewise, there will be a pressure increase in the chamber 35 of cylinder 31 and a pressure drop will occur in the chamber 39 of the same cylinder 31.

These pressure differentials are equal and of opposite sign for the wheels of a wheel assembly, but have a different magnitude between the front wheel assembly and the rear wheel assembly and the variations of the vertical load will be consequentially different.

The ratio between the load variations in the front and rear wheel assemblies is a function of the stiffness of the suspensions of the wheels and is independent of the subsequent action of the adjuster.

As a result of the pressure variations aforesaid, in the example of manoeuver in question, i.e. a bend to the right, a force directed downwards is generated on the piston 28, while an upwards directed force is generated in the piston 29. The magnitude of said forces is a function both of the pressure variations and the cross-sectional areas of the pistons 28 and 29.

The two pistons remain at a balance and the load shift adjuster 27 does not enter action in the only case in which the variations of the pressure are in the inverse ratio of the cross-sectional areas of the pistons, that which is tantamount to say that the front and rear load shifts are in a mutual well defined ratio to one another.

If this situation does not occur, for example if the ratio of the front load transfer to the rear load transfer is less than the preselected one, the downward force acting upon the piston 28 is smaller than the upward force acting upon the pistons 29 so that the two pistons are shifted upwards.

By having the piston 29 displaced, the duct 363 is put in communication with the branching-off 374 of the duct 364, so that the non-return valves 384 allows a seeping of liquid. This fact causes a decrease of the pressure to occur in the stay tube 103 and an increase of the value of the pressure in the stay tube 104, while the level-adjuster 193 simultaneously delivers to the internal spaces 133 of the stay tube 103 that volume of liquid which is required to annul the depression of the car body as due to rolling. Thus, by decreasing the pressure in the internal space 133, the stay tube 103 absorbs a smaller load.

Concurrently therewith, while the level adjuster 194 discharges from the internal space 134 of the stay tube 104 the volume of liquid which is necessary of offset the car body lift due to rolling, the internal space 134 itself receives an additional volume of liquid, which, as outlined above, originates a pressure increase so that the stay tube 104 absorbs a heavier load, and exactly the load in excess as discharged from the other wheel of the rear wheel assembly. Summing up, the load shift at the rear section of the vehicle tends to be decreased.

For the front section of the vehicle, conversely, the lift of the piston 28 in its cylinder 31 does not originate any interconnection between the internal spaces 131 and 132 of the stay tubes 101 and 102 because the non-return valve 381 remains closed under the action of the heavier pressure existing in the branching-off 371 relative to the duct 362.

Thus, while the stiffness towards the rolling motion of the rear assembly is caused to be decreased by the interconnection between the stay tubes 103 and 104 as brought about by the load-shift adjuster 27, the stiffness of the front assembly does not change substantially and remains on comparatively high a value. The action of the external rolling torque thus tends to be balanced principally by the front assembly, while, concurrently, the level adjusters 191, 192, 193, 194 enter action in the sense of restoring the trim which had been altered by the rolling motion.

Once that the load shifts have been carried out in the preselected ratio, the two pistons 28 and 29 tend to be restored at a balance again and the load-shift adjuster is stably brought back to the neutral position again with the aid of the spring 32. The interconnection between the stay tubes of the wheels in both the front and the rear wheel assemblies is thus cut off once again.

The same condition of equilibrium is achieved irrespective of the stiffness to rolling which have been adapted for the front and the rear wheel assemblies and irrespective of the desired load-shift ratios.

The suspensions which have been described behave, of course, in a similar manner in the cases in which the car goes on a left road bend.

The variation of static load of the vehicle coextensive with a variation of the position of the centre of gravity can be regarded as a superposition of the three situations described hereinbefore (variation of the static load on the centre of gravity and variation of dynamic load due to a pitching torque and a rolling torque).

The suspension described hereinabove behaves, in practice, as a passive suspension in the presence of unevenness of the road surface inasmuch as the level adjusters 191, 192, 193, 194 are preset so as to pass over the signals of variations of trim due to the shocks caused by road unevenness. However, the presence of the load-shift adjuster acts in such a way that a shock on the wheel of a wheel assembly be absorbed partially by the other wheel of the same wheel assembly, the variation of the angle of rolling being consequently reduced.

If, for example, the front left wheel meets an obstacle, the pressure in the space 131 of its stay tube 101 undergoes an increase; as a result, the piston 28 of the load-shift adjuster tends to be shifted downwards and establishes a communication between the stay tubes 101 and 102 of the left and right front wheels via the valve 382. In the stay tubes of the rear wheel assembly the pressures are equal and are changed but to a small extent due to the shift of the piston 29 of the adjuster.

Summing up, the virtue of the load-shift adjuster, the stiffness to rolling of the suspensions of the front wheels tends to be decreased and, as a result, the suspensions themselves of the front wheels do not absorb rolling torques and the car body undergoes minimum rolling rotations. A similar behaviour is experienced, obviously, if it is a rear wheel which meets an obstacle.

Figure 2:
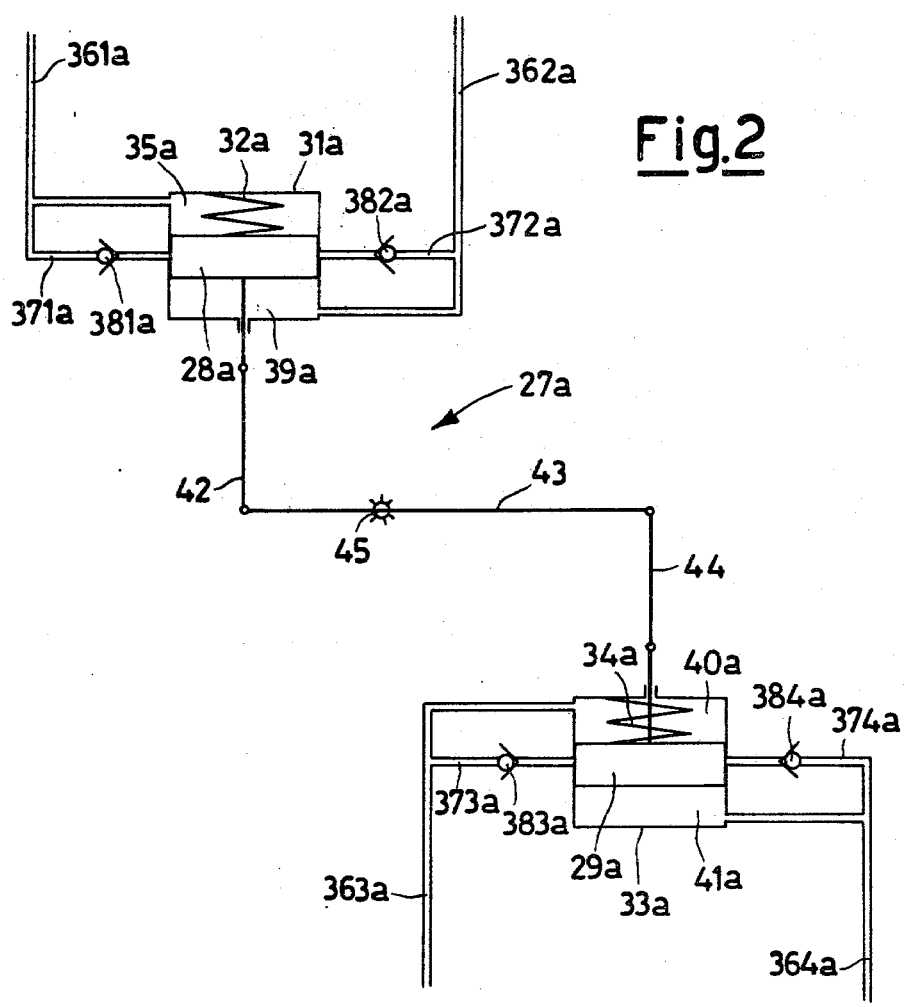
FIG. 2 shows a modification of a detail of the suspensions of FIG. 1.

FIG. 2 shows a different example of a load-shift adjuster, 27a, which is composed by two pistons 28a and 29a which are reciprocable in a sealtight manner in the respective cylinders 31a and 33a. The two pistons are interconnected by a linkage composed by a rod 42, a lever 43 and another rod, 44. The two rods 42 and 44 are pivoted to the respective pistons 28a and 29a and also to the lever 43: the latter, in turn, is pivoted at 45.

For the ducts which connects the stay tubes 101, 102, 103, 104 to the cylinders 31a and 33a of the load shift adjuster 27a, and likewise for the similar component parts, the same numerals of FIG. 1 have been used, followed by the latter a.

The load shift adjuster 27a operates in very much the same way as the adjuster 27 of FIG. 1. The only difference is that, in the case considered now, the condition of equilibrium of its two pistons is a function of the arms of the levers 43 and equilibrium occurs when the variations of pressure acting upon the pistons (which have the same cross-sectional area) are in the inverse ratio of that of the arms of the lever 43.

In the suspensions depicted in FIG. 1 and which have already been described, the stay tube (101, 102, 103, 104) of each wheel is connected to the load shift adjuster 27 (or 27a) by a duct 361, 362, 363, 364 (or 361a, 362a, 363a, 364a) which opens freely into the variable-volume internal space (131, 132, 133, 134) of every one of the stay tubes concerned.

Figure 3:
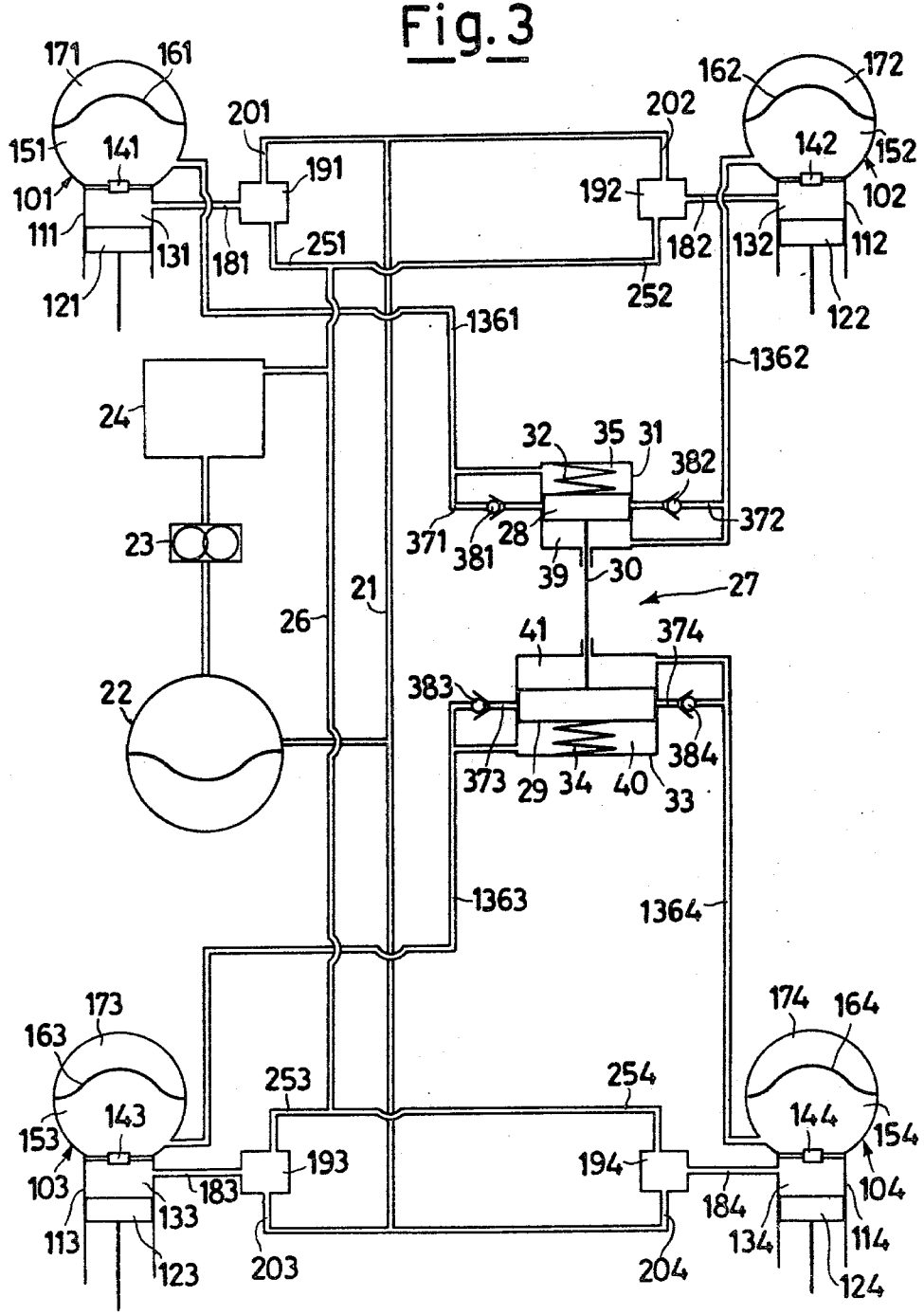
FIG. 3 is an overall view of a second embodiment of the suspensions according to the invention.

According to the embodiment depicted in FIG. 3, conversely, it is so provided that the stay tube of each wheel is operatively connected to the load shift adjuster 27 (or 27a) via shock-absorbing members which are adapted to dampen the shocks transferred between the two wheels of a group of wheels when one wheel passes on an isolated obstacle and the two stay tubes of the wheels concerned are mutually connected.

As shock-absorbing members can be used, more particular, the same shock-absorbers as incorporated in the telescopable stay tubes of the wheels, that is, the throttling valves (141, 142, 143, 144) and the equalizing chambers (151, 152, 153, 154). This result is obtained by substituting, for the ducts 361, 362, 363, 364 (or 361a, 362a, 363a, 364a), respective ducts 1361, 1362, 1362, 1364 which open, rather than into the internal spaces 131, 132, 133, 134, into the equalizing chambers 151, 152, 153, 154.

The result is that the active suspensions illustrated in FIG. 3 operate like those shown in FIG. 1 in the case of variations of the static load on the centre of gravity, or off the centre of gravity, and in the case of variations of the dynamic load under conditions of car pitching due to the acceleration and braking manoeuvers, or also under conditions of rolling when a road bend is being negotiated.

When a wheel passes on an insolated obstacle, there is the advantage, in terms of a smaller disturbance impressed to the car body (an improved comfort in the run) due to the diminished stiffness against rolling of the wheel assembly to which the wheel co-ncerned belongs, by virtue of the interconnection which is provided between its attendent telescopable stay tube and that of the other wheel of the same wheel assembly via the load shift adjuster 27 (or 27a).

Moreover, by virtue of the provision, in the circuit of mutual connection between the stay tubes, of shock-absorbers (which in the embodiment of FIG. 3 coincide with the shock-absorbers themselves of the suspensions), there is achieved, in the case of a shock due merely to a wheel passing on an insolated obstacle, an improved dampening of the motions of the two pistons in the internal spaces of the stay tubes of the group of wheel concerned, so that the shocks transmitted between the two wheels of the same group of wheels are minimized as to their amplitude and the result is that quite satisfactory a traction coefficient can be obtained even when the road is up.

We claim:

1. Active suspensions for a motor vehicle equipped with a car body which is the suspended mass and wheels which are the non-suspended mass, said suspensions comprising usual resilient means and shock-absorbing means inserted between the car body and the wheel hubs, telescopable stay tubes filled with liquid and inserted, each, between the car body and the hub of a car wheel, level-adjusters operatively connected to said telescopable stay tubes, said level-adjusters being composed by valve means for establishing communication between said telescopable stay tubes alternately with a source of pressurized liquid and with a sump, said valve means comprising means responsive to the variations of the mutual distance between the car body and every wheel, said responsive means being connected to the car body itself and to the hub of every wheel through means for filtering off the signals indicative of said variations of such mutual distance so that the signals originated by shocks due to road unevenness are not detected, said responsive means being operatively connected to said valve means to command them to establish a communication between said stay tubes and the source of pressurized liquid when a depression of the car body relative to the respective wheel is detected and for commanding them to establish a communication between said stay tubes and the sump when a lift of the car body relative to the respective wheel is detected, said suspensions being characterized in that each of said telescopable stay tubes is operatively connected to a level-adjuster of its own and is also operatively connected to a load-shift adjuster, said load-shift adjuster being means for controlling the distribution ratio of the load shifts between heavily loaded wheels and lightly loaded wheels in the front and the rear wheel assemblies under combined conditions of vehicle pitching and of vehicle rolling by properly interconnecting the stay tube relative to the respective wheel of at least on wheel assembly.

2. Active suspensions according to claim 1, characterized in that said load-shift adjuster is composed by a slide valve comprising two double-acting pistons reciprocable in their attendant cylinders, the space comprised between each cylinder and one surface of the relevant pistons being connected by at least one duct to the telescopable stay tube of the wheel of a wheel assembly, the space comprised between each cylinder and the other surface of the relevant piston being connected by at least one duct to the telescopable stay tube of the other wheel of the same wheel assembly.

3. Active suspensions according to claim 2, characterized in that from each of said ducts at least a branching-off stems, which is connected to the same cylinder into which said duct opens, said branching-off being equipped with valve means adapted to allow the flow of liquid from the internal space only to the duct, the relevant piston cutting off said branching-off when the same piston is in its neutral position and establishing a communication between the branching-off and either internal space of the cylinder when the piston leaves its neutral position.

4. Active suspensions according to claim 2, characterized in that said pistons have a differential cross-sectional area from one another, the ratio between said cross-sectional areas being defined by the preselected distribution ratio between the front wheels and the rear wheels under conditions of vehicle rolling.

5. Active suspensions according to claim 2, characterized in that said two pistons are mutually connected by a linkage which is adapted to provide a variable transmissione ratio.

6. Active suspensions according to claim 2, characterized in that said two pistons engage resilient means capable of holding such pistons within the respective cylinders in the neutral preselected position aforementioned, when the pistons are at a balance.

7. Active suspensions according to claim 1, characterized in that the telescopable stay tube of each wheel is operatively connected to the load-shift adjuster through shock-absorbing members adapted to dampen the shocks transmitted between the two wheels of a wheel group when either wheel passes on an isolated obstacle and the stay tubes of the same two wheels are mutually connected to one another.

8. Active suspensions according to claim 7, characterized in that said shock-absorbing members are composed by the usual shock-absorbers aforementioned incorporated in the telescopable stay tubes of each wheel.

9. Active suspensions according to claim 8, characterized in that said usual shock-absorbing means are composed by throttling valve means inserted between the internal space of each telescopable stay tube and a respective equalization chamber connected through at least one duct to said load-shift adjuster, said equalization chamber being also an integral part of said shock-absorbing means.

10. Active suspensions for a motor vehicle equipped with a car body which is the suspended mass and wheels which are the non-suspended mass, said suspensions comprising usual resilient means and shock-absorbing means inserted between the car body and the wheel hubs, telescopable stay tubes filled with liquid and inserted, each, between the car body and the hub of a car wheel, a front wheel assembly comprising at least two wheel hubs, a rear wheel assembly comprising at least two wheel hubs, level adjusters operatively connected to said telescopable stay tubes, said level-adjusters being composed of valve means for establishing communication between said telescopable stay tubes alternatively with a source of pressurized liquid and with a sump, said valve means comprising means responsive to the variations of the mutual distance between the car body and every wheel, said variation responsive means being connected to the car body itself and to the hub of every wheel through means for filtering off the signals indicative of said variations of such mutual distance so that the signals originated by shocks due to road unevenness are not detected, said variation responsive means being operatively connected to said valve means to command them to establish a communication between said stay tubes and the source of pressurized liquid when a depression of the car body relative to the respective wheel is detected and for commanding them to establish a communication between said stay tubes and the sump when a left of the car body relative to the respective wheel is detected, said suspensions being characterized in that each of said telescopable stay tubes is operatively connected to a level-adjuster of its own and is also operatively connected to a load-shift adjuster, said load-shift adjuster being means for controlling the distribution ratio of the load shifts between plural heavily loaded wheels and at least one lightly loaded wheel under combined conditions of vehicle pitching and rolling, said means for controlling including means for sensing a load shift between at least two of the heavily loaded wheels and means responsive to said sensing means for selectively interconnecting the stay tubes of each wheel of the front wheel assembly and selectively interconnecting the stay tubes of each wheel of the rear wheel assembly while maintaining the operatively of the level-adjusters of each wheel assembly.

* * * * *